Figure 1:
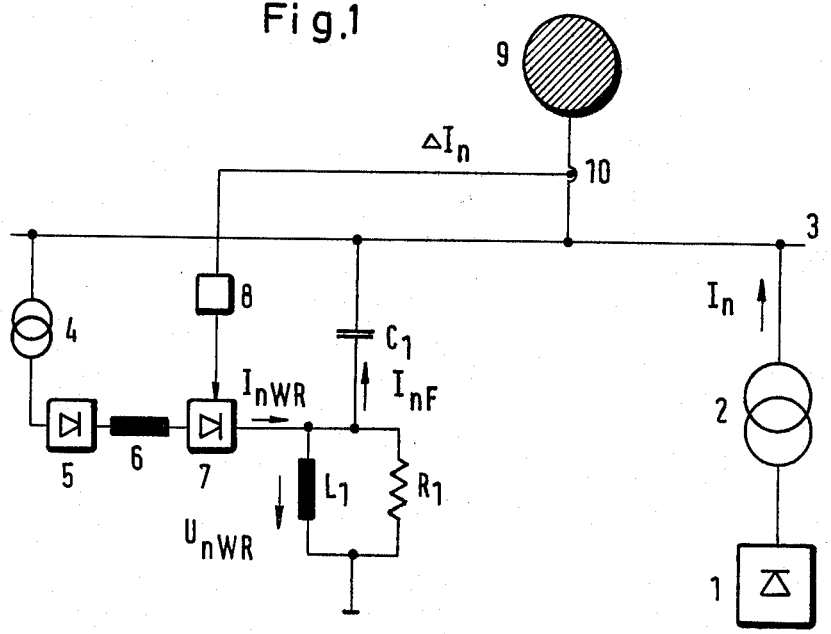

United States Patent [19]

Häusler et al.

[11] 4,228,492
[45] Oct. 14, 1980

[54] CIRCUIT ARRANGEMENT AND METHOD FOR THE COMPENSATION OF HARMONIC CURRENTS

[75] Inventors: Michael Häusler, Hirschberg; Karl W. Kanngiesser, Viernheim, both of Fed. Rep. of Germany

[73] Assignee: Brown, Boveri & Cie AG, Mannheim-Käfertal, Fed. Rep. of Germany

[21] Appl. No.: 957,424

[22] Filed: Nov. 2, 1978

[30] Foreign Application Priority Data

Nov. 4, 1977 [DE] Fed. Rep. of Germany ....... 2749360

[51] Int. Cl.² .............................................. H02M 1/12
[52] U.S. Cl. ...................................... 363/48; 333/176
[58] Field of Search ................................... 363/44–48, 363/35–37, 51; 307/105; 333/172, 175–176

[56] References Cited

U.S. PATENT DOCUMENTS

| | | | |
|---|---|---|---|
| 3,290,578 | 12/1966 | Ainsworth | 333/176 X |
| 3,555,291 | 1/1971 | Dewey | 333/176 X |
| 3,935,551 | 1/1976 | Henniger et al. | 333/176 |
| 4,053,820 | 10/1977 | Peterson et al. | 363/44 |

*Primary Examiner*—Harry E. Moose, Jr.
*Assistant Examiner*—Peter S. Wong
*Attorney, Agent, or Firm*—Herbert L. Lerner

[57] ABSTRACT

Circuit for the compensation of harmonic currents in a network, including a wideband highpass filter having a choke connected in parallel with a damping resistor and a capacitor connected in series therewith, and a harmonic converter connected to the highpass filter.

2 Claims, 3 Drawing Figures

CIRCUIT ARRANGEMENT AND METHOD FOR THE COMPENSATION OF HARMONIC CURRENTS

The invention relates to a circuit arrangement and a method for the compensation of harmonic currents by means of a highpass filter and a harmonic converter.

The circuit arrangement according to the invention can find application, for instance, in a single/three-phase a-c network coupled to a d-c high-voltage transmission network (HGUe) by means of a static converter.

In operation, HGUe converters generate a multitude of harmonics which can lead to undesirable distortions of the bus bar voltage. In order to avoid these distortions, it is known to connect high-Q tuned highpass filter circuits and/or low-Q highpass broadband filters to the bus bar (W. Dimmler, H. Haubold, M. Schraudolph and G. Weigel: Adjustable Chokes for the Filter Circuits of the D-C High-Voltage Transmission System from Cabora Bassa to Johannesburg, Techn. Mitteilungen AEG-Telefunken, 64 (1974) 7, pages 249 to 256).

It is considered a disadvantage of the tuned highpass filter circuits that the filter effect is reduced in the event of frequency variations of the network or of deviations of the filter circuit parameters, for instance, due to aging or temperature effects; the higher the Q of the filter circuit, the greater this reduction becomes.

Since the effect of tuned highpass filter circuits of high Q is always limited to one harmonic, a number of filter circuits with different resonance frequencies is required, which cause parallel resonances among each other while in some circumstances can have a very disturbing effect and can lead to detrimental overloading of the filter circuits.

Broadband highpass filters with low Q do not have these disadvantages. From this stems the trend to use only damped broadband highpass filters if at the same time twelve-pulse converter groups are used (W. Schraudolph, G. Weigel: Chokes with Built-In Resistance for the Highpass of the D-C High-Voltage Transmission System from Cabora Bassa to Johannesburg, Techn. Mitteilungen AEG-Telefunken 65 (1975) 5, pages 157 to 159).

Depending on the network load conditions or in consideration of already existing high-Q filter circuits, however, the use of broadband highpass filters alone may not be sufficient in some cases to meet the specified requirements as to the harmonic content of the line voltage over the entire spectrum.

To reduce the frequency dependence and parameter sensitivity of tuned highpass filter circuits, it is known to expand these basically passive filter circuits into so-called active filters by coupling harmonic inverters thereto (N. Mohan, H. A. Peterson, W. F. Long, G. R. Dreifuerst, J. J. Vithayathil: Active Filters for AC Harmonic Suppression, Paper A 77026-8, 1977, IEEE PES Winter Meeting, New York).

The harmonic inverter is capable of making the impedance of the previously passive filter circuit zero or even negative for the frequencies to which the filter circuit is tuned.

A parallel resonant circuit with a high Q is additionally required for coupling. Since substantial parts of the active filter include high Q resonant circuits, the detrimental property of weakly damped parallel resonances being excited, continues to be present.

It is therefore an object of the invention to provide a circuit arrangement and method for the compensation of harmonic currents in a single/three-phase a-c network which overcomes the hereinaforementioned disadvantage of the heretofore known devices of this general type, and wherein stringent requirements as to frequency independence, parameter insensitivity and residual ripple are to be met.

With the foregoing and other objects in view, there is provided, in accordance with the invention, a circuit for the compensation of harmonic currents in a network, comprising a wideband highpass filter having a choke connected in parallel with a damping resistor, and a capacitor connected in series therewith, and a harmonic converter connected to the highpass filter.

In accordance with another feature of the invention, the harmonic converter is connected to the common connection point of the choke, resistor and capacitor.

In accordance with a further feature of the invention, there is provided a parallel resonant circuit having a choke, a capacitor and a resistor, the parallel resonant circuit being connected to the common connection point of the highpass filter and the harmonic converter.

In accordance with an added feature of the invention, there are provided control means for addressing the harmonic converter, the control means having an output connected to the harmonic converter and an input being fed the current difference between the current of the highpass filter and the harmonic current to be compensated.

In accordance with an additional feature of the invention, there is provided a transformer connected to the single/three phase network or the corresponding bus bar, a rectifier connected to the transformer and a smoothing choke connected to the rectifier, the harmonic converter being connected to the smoothing choke.

In accordance with yet another feature of the invention, there are provided control means for addressing the harmonic converter, the control means having an output connected to the harmonic converter and an input being fed the current difference between the current of the highpass filter and the harmonic current to be compensated. The control means may be provided when using the transformer, rectifier and smoothing choke as well.

In accordance with a concomitant mode of the invention, there is provided a method which includes controlling a current fed from a harmonic converter to a wideband highpass filter having a choke connected in parallel with a damping resistor, and a capacitor connected in series therewith, so that the current difference, flowing into the single/three phase a.c. network, between the current of the highpass filter and the harmonic current to be compensated goes toward zero.

Through the use of the wideband highpass filter, according to the invention, it is achieved in a particularly advantageous manner that the filter effect of the filter circuit remains in the event of frequency fluctuations of the network as well as in the event of variations of the filter circuit parameters due to aging or temperature effects. Overloading of the filter circuit due to parallel resonances is advantageously avoided.

Existing wideband highpass filters can advantageously be retrofitted into active filters as well. This covers the risk of insufficient filtering action, which occurs if wideband highpass filters are used alone instead of the heretofore common combination of wideband highpass filters with tuned highpass filter circuits.

The cost for modifying a wideband highpass filter into an active filter is less than the cost for equivalent tuned filter circuits.

The invention therefore makes it possible to retrofit existing highpass filters if difficulties occur, and dispense in many cases with tuned high-Q filter circuits in the planning of new HGUe installations with pure twelve-pulse operation.

Other features which are considered as characteristic for the invention are set forth in the appended claims.

Although the invention is illustrated and described herein as embodied in a circuit arrangement and method for the compensation of harmonic currents, it is nevertheless not intended to be limited to the details shown, since various modifications and structural changes may be made therein without departing from the spirit of the invention and within the scope and range of equivalents of the claims.

Figure 2:
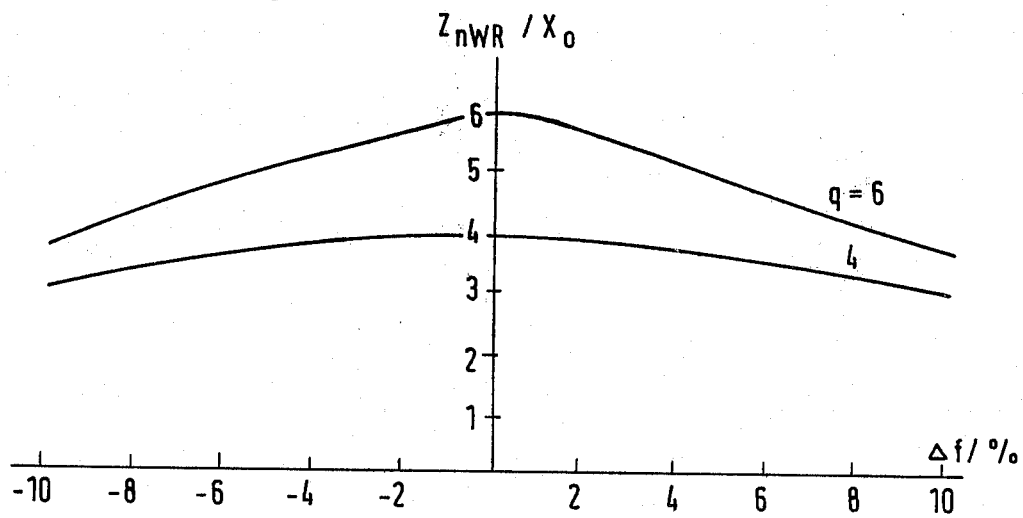
Figure 3:
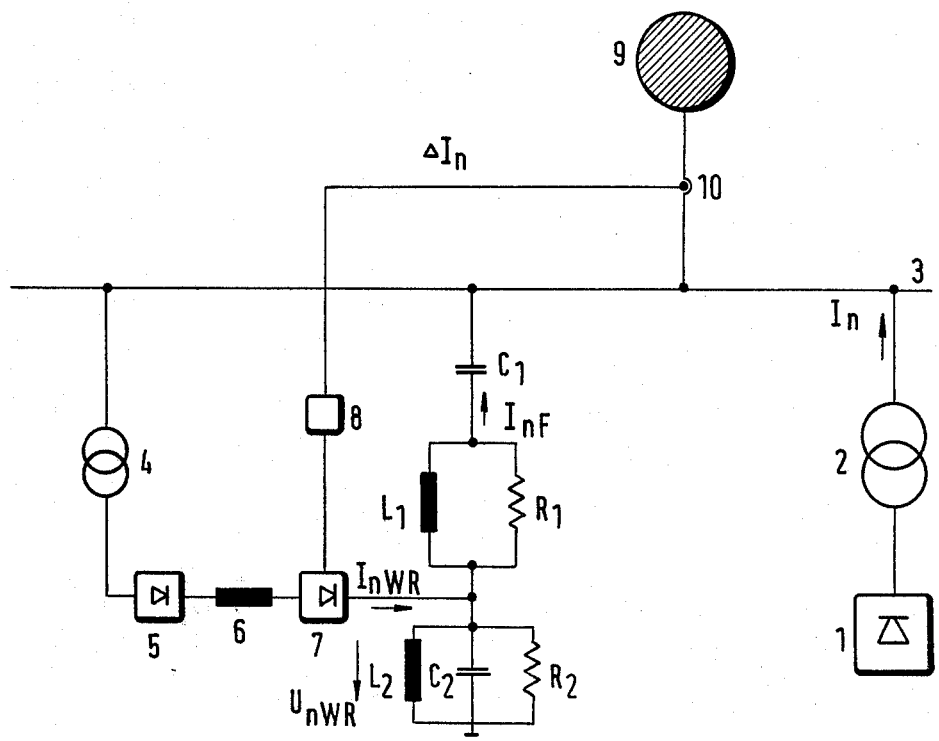

The construction and method of operation of the invention, however, together with additional objects and advantages thereof will be best understood from the following description of specific embodiments when read in connection with the accompanying drawings, in which:

FIG. 1 is a schematic circuit diagram of an active wideband highpass filter with an active-filter effect near the resonance frequency of the highpass;

FIG. 2 is a graph showing the dependence of the harmonic converter load impedance $Z_{nWR}$ with respect to the resonance impedance $X_o$ plotted as the ordinate, on the deviation of the network frequency from the resonance frequency of the filter plotted as the abscissa; and FIG. 3 is a schematic circuit diagram of a wideband highpass filter with active-filter effect if the resonance frequency deviates.

Referring now to the figures of the drawing and first, particularly, to FIG. 1 thereof, there is shown in a one-pole presentation of a three-phase system an active wideband highpass filter having a capacitor $C_1$, damping resistor $R_1$ and choke $L_1$. The filter is connected to a three-phase bus bar 3 fed by means of a static HGUe converter 1 through a converter transformer 2. The converter transformer 2 feeds harmonic current $I_n$ to the bus bar 3. The elements $L_1$ and $R_1$ of the wideband highpass filter are connected in parallel with each other and are at ground potential, while $C_1$ is connected in series therewith and is tied to the bus bar 3. A transformer 4, likewise connected to the bus bar 3, feeds a rectifier 5 which supplies a harmonic converter 7, preferably a self-commutating converter, through a smoothing choke 6.

The harmonic converter 7 feeds a current $I_{nWR}$ into the wideband highpass filter at the common junction point of $C_1$, $L_1$ and $R_1$.

The filter current flowing through the capacitor $C_1$ is designated $I_{nF}$. The harmonic converter 7 is controlled by a control device 8. To the input side of the control device 8 is applied a signal which corresponds to the measured current difference $\Delta I_n$ between the filter current $I_{nF}$ and the HGUe harmonic current $I_n$. The current difference $\Delta I_n$ is measured by means of a measuring device 10 disposed in the connection between the bus bar 3 and the network 9.

The wideband highpass filter differs in general from high-Q tuned filter circuits in that a damping resistor $R_1$ is shunted across the choke $L_1$ of the tuned circuit in every case, while in tuned filter circuits this resistor $R_1$, if necessary at all, is connected in series with the choke. This results in different frequency responses of the wideband highpass filter and tuned high-Q filter circuits.

The choke $L_1$ and the capacitor $C_1$ have, like every choke and every capacitor, a loss resistance which would have to be taken into consideration as being in series with $L_1$ in the case of the choke and as being in parallel with $C_1$ in the case of the capacitor. The effect of these two resistances, however, can be neglected in the wideband highpass filter as compared to the damping resistor $R_1$.

Contrary to the high-Q filter, the damped wideband highpass filter need not be tuned absolutely accurately to the fixed frequency for which the active-filter effect is to be obtained.

The resonance frequency of the wideband highpass filter is placed so that, possibly in conjunction with further wideband highpass filters, an optimum filtering effect for as many current harmonics as possible is obtained under given networkd conditions. It is customary to put the resonance frequency of the wideband highpass filter or parallel wideband highpass filters between the 11th and the 13th harmonic of the network frequency. Sometimes wideband highpass filters with a resonance between the 23rd and 25th harmonic are additionally provided.

If a wideband highpass filter does not reach the required low input resistance (impedance), as seen from the network, for a characteristic harmonic near its resonance frequency, then it is expanded into an active filter for the corresponding harmonic by coupling the harmonic converter 7.

It will be assumed that the frequency $f_n$ of the current $I_{nWR}$ is near the resonance frequency $f_o$ of the wideband highpass filter, where $$f_o = \frac{1}{2\pi} \sqrt{\frac{1}{L_1 C_1}}.$$

For complete compensation of the interfering harmonic current $I_n$ of the HGUe converter 1, the wideband highpass filter, as seen from the harmonic converter 7, represents a "parallel resonant circuit" with the elements $C_1$, $L_1$ and $R_1$.

The effect of frequency deviations $\Delta f$ (deviation of the network frequency from the resonance frequency of the filter) on the impedance $Z_{nWR}$ of the "parallel resonant circuit" with respect to the impedance $$X_o = \sqrt{L_1/C_1}$$

is shown graphically in FIG. 2. It can be seen therefrom that the converter power of the harmonic converter 7 need be increased only by 8 and 20%, respectively, for a Q of 4 or 6, in order to compensate the harmonic current $I_n$ of the HGUe converter 1 at a frequency deviation of 5% (with $I_n = I_{nF}$, see FIG. 1).

To cover the losses $I_n^2 \cdot x_o/q$, the harmonic converter 7 draws energy from its d-c side. As indicated in FIG. 1, this energy can be supplied by a line rectifier 5.

The presentation above applies only to the ideal case where the compensation of the HGUe harmonic current $I_n$ is completely successful. A prerequisite for the approximate fulfillment of this requirement is a suitable measuring device 10 for picking up the difference $\Delta I_n$ between the filter current $I_{nF}$ and the HGUe harmonic current $I_n$, and a control device 8 which acts upon the harmonic converter 7 in such a manner that the difference $\Delta I_n$ goes toward zero.

As long as the harmonic converter 7 is not addressed, the wideband highpass filter has the same properties as before. Its impedance $Z_{nWR}$ as seen from the point of connection to the network with respect to the impedance $X_o$ is $$\frac{Z_{nWR}}{X_o} = \frac{1}{jf'} + \frac{1}{\frac{1}{q} + \frac{1}{jf'}}$$

with $$X_o = \sqrt{\frac{L_1}{C_1}}$$

$$f' = f/f_o$$

$$f_o = \frac{1}{2\pi \sqrt{L_1 C_1}}$$

$$q = R_1/X_o$$

and where f=frequency of any harmonic n.

When the harmonic converter 7 is fired and is controlled so that $\Delta I_n=0$, then it covers the internal voltage drop of the current of nth frequency at the wideband highpass filter. As seen from the network, the apparent filter impedance for the respective frequency is zero.

The voltage for which the harmonic converter 7 must be constructed, corresponds to that of the voltage drop caused by the current $I_n$ at the capacitor $C_1$:

$$U_{nWR} = I_n \cdot \frac{1}{\omega_n C_1}$$

where $\omega_n = 2\pi f_n$ = angular frequency of any harmonic n. The current which must be supplied by the harmonic converter 7, reaches its minimum at $$\omega_n C_1 = \frac{1}{\omega_n L_1}$$

and is $$I_{nWR} = \frac{U_{nWR}}{R_1} = \frac{I_n}{q}.$$

The minimum harmonic converter power is therefore $$U_{nWR} \cdot I_{nWR} = I_n^2 \frac{X_o}{q}. \qquad (2)$$

The occurring loss is practically exactly equal to that in a passive wideband highpass filter. Only the energy source is different; in the case of the passive highpass, the source is the HGUe converter 1 and in the case of the active highpass, it is the harmonic converter 7.

It is conceivable that in a particular case the filter action of the wideband highpass filter is not sufficient for non-characteristic harmonics, for instance, the frequency of which deviates more heavily from the resonance frequency $f_o$ of the wideband highpass filter. For this case it is proposed to couple the harmonic converter 7 to the wideband highpass filter through a parallel resonant circuit of relatively high Q, as shown in FIG. 3, which is a one-pole only presentation of a three-phase system.

The resonance frequencies of the wideband highpass filter and the parallel resonant circuit are different in this embodiment, the parallel resonant coupling circuit shown in FIG. 3 having its resonance at the frequency at which the active-filter effect is desired.

The parallel resonant circuit including a damping resistor $R_2$, a capacitor $C_2$ and a choke $L_2$ is connected in series with the wideband highpass filter. One pole of the parallel resonant circuit is at ground potential and the common junction point of the parallel resonant circuit and the wideband highpass filter forms the feed point of the harmonic converter 7.

The difference between the structure and the above-mentioned known construction (N. Mohan, H. A. Peterson ...) is that no high-Q series resonant circuit is used for coupling to the line, but a damped wideband highpass filter is used instead. The filter action therefore depends negligibly on the damped wideband highpass filter and essentially on the frequency response of the parallel resonant circuit. For the latter, relatively low Q-values are possible without an adverse effect on the filtering action or an excessive increase in losses. Therefore, the frequency and parameter sensitivity, respectively, of the active filter with the wideband highpass filter can be kept lower than that of the active filter with tuned filters.

The parallel resonant circuit with the elements $C_2$, $L_2$ and $R_2$ changes the frequency characteristic of the wideband highpass filter. The more or less wide frequency band, in which active filter properties occur, is located around the tuning frequency of the parallel resonant circuit. The hereinaforementioned equation of the impedance which referred to the value $$X_o = \sqrt{\frac{L}{C}}$$

contains an additional term $$\frac{Z_p}{X_o},$$

the imaginary part of which vanishes at the tuning frequency and the real part of which is then the damping resistance $R_2$. The additional term, referred to the impedance $X_o$ of the wideband highpass filter, reads $$\frac{Z_p}{X_o} = \frac{1}{\frac{1}{rq} + kj\left(\frac{f'}{m^2} - \frac{1}{f'}\right)}$$

where $$r = \frac{R_2}{R_1}$$

$$k = \frac{L_1}{L_2}$$

$$m = \frac{f_p}{f_o} = \frac{n}{n_o}$$

and where $f_p$ is the resonance frequency of the parallel circuit and $n_o$ is the order number of the resonance frequency of the highpass referred to the line frequency.

The voltage which the harmonic converter 7 must generate to drive the current $I_{nF} = I_n$ into the network, is $$U_{nWR} = I_n Z_{nWR},$$

where $Z_{nWR}$ can be calculated from Equation (1). In approximation, we have $$Z_{nWR} = X_o \cdot \frac{1}{m} \text{ for } n < n_o$$

$$Z_{nWR} = X_o \cdot q \text{ for } n > n_o.$$

The power of the harmonic converter 7 is therefore, neglecting the leakage loss current through the parallel resonant circuit:

$$U_{nWR} \cdot I_{nWR} = I_n^2 \cdot X_o \cdot (1/m) \text{ for } n < n_o \quad (3a)$$

$$U_{nWR} \cdot I_{nWR} = I_n^2 \cdot X_o \cdot q \text{ for } n > n_o \quad (3b).$$

The power loss in the parallel resonant circuit is $$P = U_{nWR}^2 \cdot \frac{1}{R_2} = I_n^2 \cdot X_o \frac{1}{r m^2 q} \text{ for } n < n_o$$

$$= \frac{I_n^2 \cdot X_o \cdot q}{r} \text{ for } n > n_o$$

A comparison of the converter power according to (2) with (3a) and (3b) shows that it is more expensive to build an active filter for frequencies that do not coincide with the resonance frequency of the wideband highpass filter. Moreover, a parallel resonant circuit is additionally required.

There are claimed:

1. Circuit for coupling a harmonic converter formed of controllable rectifiers to collector bus bars of a three-phase a-c network to compensate harmonic currents in the network, the harmonic converter having an input and an output, including a rectifier and a choke connected to said input, comprising a damped low Q wideband highpass filter covering the entire frequency range of disturbing harmonics, said filter having a choke connected in parallel with a damping resistor, and a capacitor connected in series therewith, said capacitor being connected between the output of the harmonic converter and each collector bus bar of the three-phase a-c network and said parallel connected choke and resistor being connected between the output of the harmonic converter and ground.

2. Circuit for coupling a harmonic converter formed of controllable rectifiers to collector bus bars of a three-phase a-c network to compensate harmonic currents in the network, the harmonic converter having an input and an output, including a rectifier and a choke connected to said input, comprising a damped low Q wideband highpass filter covering the entire frequency range of disturbing harmonics, said filter having a choke connected in parallel with a damping resistor, and a capacitor connected in series therewith, said filter being connected between the output of the harmonic converter and each collector bus bar of the three-phase a-c network, and a parallel resonant circuit connected between the output of the harmonic converter and ground.

* * * * *